(12) United States Patent
Ledbetter et al.

(10) Patent No.: US 8,228,225 B1
(45) Date of Patent: Jul. 24, 2012

(54) REMOTE SWITCH OPERATOR

(76) Inventors: Finley Lee Ledbetter, Argyle, TX (US);
Ashley Sue Ledbetter, Argyle, TX (US)

( * ) Notice: Subject to any disclaimer, the term of this patent is extended or adjusted under 35 U.S.C. 154(b) by 583 days.

(21) Appl. No.: 12/538,299

(22) Filed: Aug. 10, 2009

(51) Int. Cl.
*H04L 29/00* (2006.01)
*H01H 9/00* (2006.01)
*H02B 11/12* (2006.01)

(52) U.S. Cl. ............ 341/176; 200/50.24; 361/641
(58) Field of Classification Search .......... 341/176; 200/50.21, 50.24; 361/600, 641
See application file for complete search history.

(56) References Cited

U.S. PATENT DOCUMENTS

| | | | |
|---|---|---|---|
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 8,063,323 B1* | 11/2011 | Ledbetter | 200/50.21 |
| 8,151,452 B2* | 4/2012 | Ledbetter | 29/756 |
| 8,161,631 B1* | 4/2012 | Ledbetter et al. | 29/762 |
| 2009/0014291 A1* | 1/2009 | Stevenson | 200/50.24 |
| 2012/0024677 A1* | 2/2012 | Safreed et al. | 200/50.24 |

* cited by examiner

*Primary Examiner* — Howard Williams
(74) *Attorney, Agent, or Firm* — Buskop Law Group, PC; Wendy Buskop

(57) ABSTRACT

A remote switch operator that is portable and lightweight with onboard power, relays, and potentiometers for controlling two or more remote units from a single remote switch operator in a watertight, explosion proof rugged housing. A method for operating the operator with electrical equipment is included. This operator allows a user to stand at least 25 feet away from an arc flash boundary with no user training needed.

17 Claims, 3 Drawing Sheets

REMOTE SWITCH OPERATOR

FIELD

The present embodiments generally relate to a remote switch operator for use with remote equipment that tests, charges, closes or trips individual electrical units in a facility, such as a hospital or a power plant.

BACKGROUND

A need exists for an portable remote switch operator that prevents harm to humans in a facility which has electrical equipment susceptible to arcing during testing, maintenance or switching out of equipment on a piece by piece basis without shutting down power to the entire facility.

The present embodiments meet these needs.

BRIEF DESCRIPTION OF THE DRAWINGS

The detailed description will be better understood in conjunction with the accompanying drawings as follows.

Figure 1:
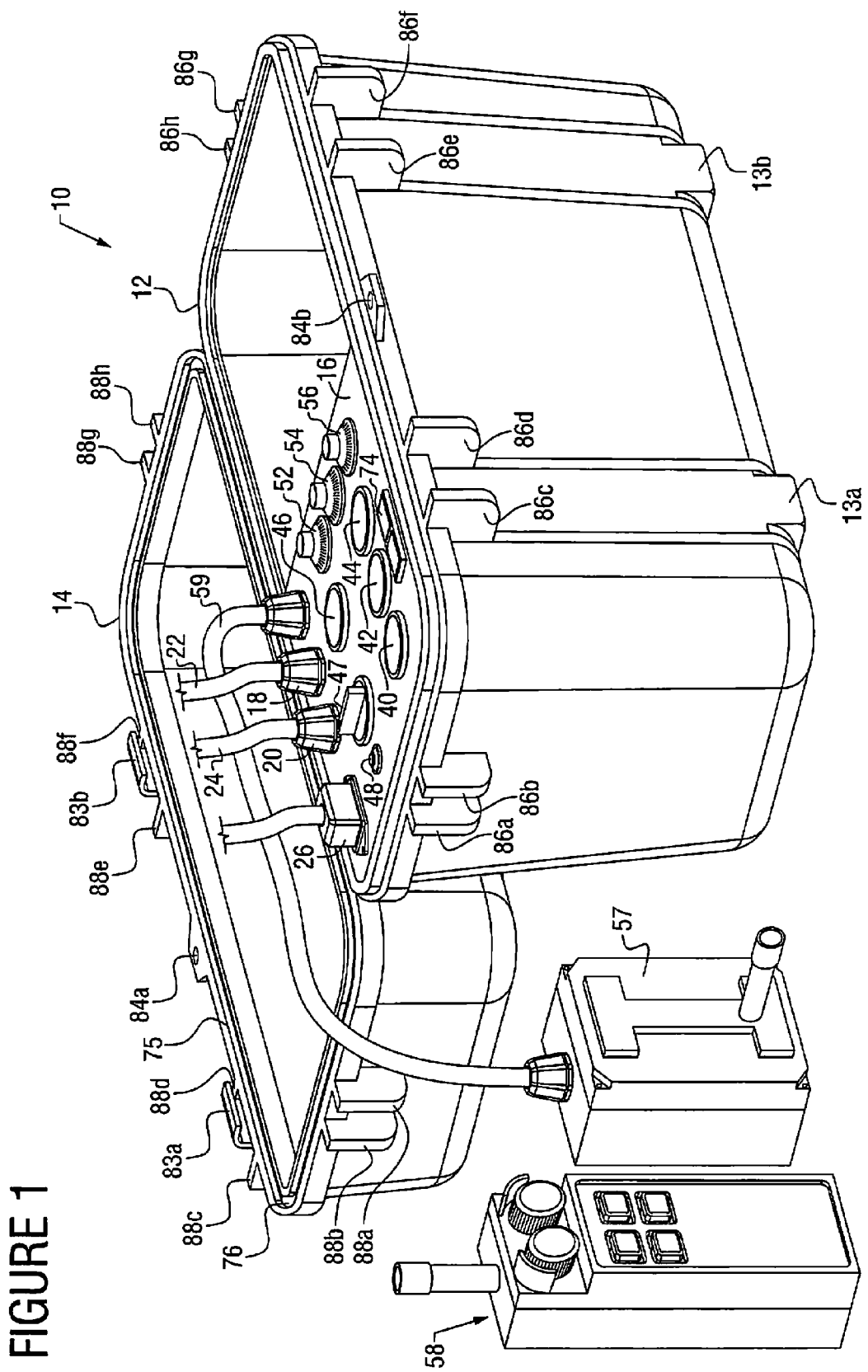
FIG. 1 is a front perspective view of the remote switch operator with the lid in the open position.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a remote switch operator for powering and controlling a robot or similar electrical device from a safe distance by a human operator.

The remote switch operator reduces the need for a human to wear an inch thick full body arc flash hazard suit when operating a equipment with the ability to generate an electrical arc which burns a person.

The invention allows an owner to more easily maintain equipment clean up, lube up equipment.

The invention can be operated by a user without detailed training A user can be using the equipment in less than 1 hour from seeing the equipment for the first time. The invention enables a wide variety of plant personnel, trained and otherwise to perform the maintenance function, which is particularly useful during labor strikes when untrained executives have to operate plants.

The invention prevents explosions and flames from reaching a person, as the operator can be in a different room during operation.

The equipment is lightweight, enabling men and women, strong and frail, to move the device.

The equipment is amazing in that the power plant does not need to be completely shut down during use of the device to switch out, test, or do maintenance on electrical equipment such as in a switch room of a power plant or Hyatt.

The device prevents an arc explosion from harming people during live switching testing or maintaining of equipment. This device allows one circuit breaker to be shut down and replaced while an entire bus of circuit breakers remains live and operational. The device is extraordinarily effective in saving time and money during maintenance, as well as humans from harm.

The remote switch operator has a housing for containing various electronic components. The housing has a body with a lid that can be opened or securely and tightly closed in a watertight engagement.

The housing is made from a material that resists static charge build up. The housing can be made from a durable polymer, such as an elastomeric blend with a polypropylene that is tough, and preferably explosion proof. The housing can be made from other materials such as lightweight sturdy composites, and similar waterproof materials, including coated metals.

Inside the body of the housing is a face plate. The face plate can be powder coated steel or aluminum with a coating that prevents static build up or the development of other static charges. The powder coating also prevents rust enabling a longer lasting device. Static and shocking are reduced and eliminated with this design.

In the face plate is a first plug for providing current and signals from the housing to a first remote device such as actuators that move handles and levels, or push buttons and other switches in a dangerous electrical environment, such as a refinery control panel area.

In the face plate is a second plug for providing current and signals from the housing to at least a second remote electrical device.

In an embodiment, the first and second plugs can each engage a cord wherein both cords connect to the same remote device and provide two different functions, such as rotate a handle using signals from one cord and pushing a button using signal from a second cord connected to the second plug.

The remote operated switch is intended to run various remote devices simultaneously and synchronously from the one location by one user.

A first cord is attached to the first plug. The first cord can be a retractile cord. The first cord is used to engage a first remote device. The first cord can transmit electrical signals and power to operate the first remote device. An example of a usable rectractile cord is a 4 strand copper wire based cord made by Autac of Tennessee. The cord is helically wound in an embodiment and elastic extendable and retractable.

The first cord and other cords used herein can be 9 feet long in an embodiment when the cord is retracted and up to 25 feet long when extended.

The cord is an important safety feature to keep the operator far from both the remote device attached to the switch and prevent arcing which might accidently occur form reaching the user.

This remote switch operator is versatile in that it can have a second plug and cord, or more plugs and cords connecting to the first remote device and/or a second remote device, a third remote device or more remote devices with additional plugs and additional cords.

Another plug, an AC plug is in the face late for receiving an AC current form an outside AC power source and for transferring the AC current to a charger power supply in the housing.

In an embodiment, the DC plug is mounted to the face plate. In another embodiment the plug can be mounted to a side of the housing and then a first connecting power cord can run from the plug interior of the housing to one or more of the batteries.

If the plug is in the side of the housing, then the plug is a secure watertight plug connection that does not permit water to enter the housing.

In an alternative embodiment, a DC battery charger can be interior to the housing and the charger can be connected to an AC power source, such as a wall plug through a second connecting power cable allowing onboard charging of the battery.

At least one battery is in the housing beneath the face plate. Two or more batteries can be used in the housing so long as the total overall weight of the housing with electronics and cords does not exceed about 50 pounds, or otherwise reduce the portability of the unit.

The remote switch operator is intended to be portable and moveable, and easily replaceable if something fails on the remote switch operator it can be replaced. The remote switch operate enables the equipment that it operates to continue to operate with a simple, light replacement of the remote switch operator, in a plug and play manner.

The batteries are contemplated to be connected in series or in parallel.

It is contemplated that the batteries will supply up to 27 volts of power to the remote device.

The batteries can be lead acid batteries, or Ni-Cad batteries such as those made by any normal DC battery supplier.

The batteries for this unit, could be replaced by fuel cells, such as those made by Angstrom Power of North Vancouver, British Columbia, which are nanosized. Nanosized fuel cells enable the unit to be even more lightweight, not including or needing a battery charger.

The batteries can be charged by a charger power supply, such as a Schauer battery charger model JAC0524R/3 with an input of 100-240 VAC 50/60 Hz, and an output of 24 DC. The charger power supply is in the housing beneath the face plate for receiving AC current from an outside source, such as a generator.

The batteries in an embodiment could be replaced with an AC/DC power supply made by CBS Arc Safe with an input voltage of 132-106 VAC, an input watt of 800-1000 watts, an input frequency of about 50 Hz, an output voltage of 27.2 volts and an output amperage of about 23-28 amps.

The batteries are secured to a mounting bracket in the housing to prevent the batteries from moving around.

In the housing is a first relay connected to a second relay such as those made by The relays are between various buttons and toggles on the faceplate and the batteries used in the housing beneath the faceplate.

A circuit board is in the housing beneath the faceplate and secured to a mounting bracket in the housing. The mounting bracket prevents the circuit board from moving. The circuit board could be connected to another component in the housing.

It is important that the electronic components in the housing are secure and do not rattle around or move around in the housing. The relays and the circuit boards are all mounted in the housing, to the face plate opposite the side to which various buttons and toggles are located.

Connected to the one or more relays and the one or more batteries is wiring that communicates to the face plate. The relays are connected in series or in parallel. The relays can be made by IDEC of Japan, such as model 618101.

A trip momentary push button is installed in the face plate electrically connected to the circuit board. The trip momentary push button causes a component on the remote device to trip a circuit.

A close momentary push button installed in the face plate is electrically connected to the circuit board. The close momentary push button causes a component on the remote device to close a circuit.

A charge/close momentary push button installed in the face plate is electrically connected to the circuit board. The charge/close momentary push button causes a component on the remote device to close a circuit and apply a charge to the circuit.

A jog momentary push button in the face plate engages the circuit board. The jog momentary push button causes minor juggling, or partial movement around a 360 degree movement path of an actuator by the remote device.

Although push buttons are shown in an embodiment, with a biasing means, allowing for quick engagement and disengagement, it is contemplated that toggles could be used, and other types of engagement means, such as membrane covered touch pad, or a touch screens, or even electronic displays that can be touched to cause engagement of the relays in the manner described.

Also in the face plate is an on/off switch for connecting or disconnecting the batteries with the at least one relay.

A circuit breaker is in the face plate connected between the relays and the on/off switch. The circuit breaker trips off when voltages exceed safety limits.

A timer circuit board is in the housing to provide commands such as time delay needed for the operator and numbers of cycles required. The timer circuit board communicates with at least one relay.

A first timer potentiometer is in the face plate connected to the timer circuit board. The first timer sets timing for a charge/close stroke of the remote device.

A second timer potentiometer is in the face plate connected to the timer circuit board.

The second timer potentiometer performs the operation of setting the timing for a charge/close stroke of the remote device in the direction opposite the charge/close stroke of the first timer potentiometer.

A stroke potentiometer is in the face plate connected to the timer circuit board which operates to set the number of cycles for the remote device, such as 1 through 9 cycles.

The remote switch operator in an embodiment can have fixed into the housing, a radio transmitter/receiver.

The radio transmitter/receiver is connected to the circuit board as well as to the batteries for communication with a hand held, portable, wireless radio controller. The radio controller is preferably water resistant in an impact resistant casing so that it does not break when the user drops it from 3 or 4 feet above a concrete floor and then lands on the concrete.

The wireless radio transmitter/receiver is removably connected under the face plate for remotely actuating the relays using the radio transmitter a distance from the remote switch operator.

In an embodiment, it is contemplated that a cell phone, PDA, iPhone™ or other blue tooth or similar remote control device could be used to connect to the radio transmitter/receiver and operate the remote operated switch.

It is contemplated that the wireless radio controller has an "on" button to turn on the power and initiate a signal to the remote control device, an "off" button to stop power and stop signals going to the remote device, a jog button for making the remote device act without a timer, a trip button to power or trip a switch, such as a solenoid switch on the remote device, a close button to power the remote device and start cycling, and a charge/close button which allows the user to operate the remote device in an automatic mode using the first and second timer potentiometers and the stroke potentiometers.

An automatic shut off switch can be mounted in the face plate connected to the circuit board for disabling a remote device when the remote device exceeds a preset amperage. This switch can connect to the radio transmitter/receiver as well as be manually operable.

The remote switch operator may have other features, such as lights, audio alarms, and "power low" indicators on the face plate. The remote switch operator in an embodiment can have water moisture detectors as well, to indicate that shorting is imminent.

The remote switch operator can have a seal in the housing for providing a water resistant, explosion proof engagement between the body and the lid.

The circuit board can include a microprocessor with flash memory. Computer instructions in the flash memory or possibly in removable or permanent data storage can be used for comparing signals from the various potentiometers to a predetermined threshold in the computer instructions.

Additional computer instructions could be used to send an instruction to cut power to the replays or send an alarm, such as over a network to a control station, or otherwise provide an indicator to an operator that a problem may be occurring that is serious.

At least one locking means can be secured to the housing to lock the lid to the body. A portion of the locking means can be on the lid, while a receiver section can be on the body. Two more latches can be used to fasten the lid in a water proof manner to the body.

When a lot of movement is contemplated for the remote switch operator (RSO III) it is consider that reinforcing ribs can be added to the body or to the lid or both to make sure the housing does not deform on impact, such as when the unit is dropped from 3 or 4 feet onto a concrete surface.

One to twelve body reinforcing ribs could be used on the body and up to 8 or even 12 lid reinforcing ribs could be formed in the lid to prevent deformation of the housing in the presence of heat over 140 degrees F. and pressures exceeding 1 atm.

The housing is contemplated to have a one piece molded body and a one piece molded lid in an embodiment.

The remote switch operator is expected to have a weight between 30 pounds to 50 pounds and smaller units might be usable if the batteries can be replaced by light weight fuel cells and no recharging mechanisms are needed for long periods of time.

An embodiment contemplates that a hinge is used to pivotably secure the lid to the body.

An embodiment contemplates that the face plate includes as a one piece unit, a face plate side connected to the face plate at a 90 degree angle. The face plate side is for supporting the aforementioned radio transmitter/receiver within the housing while further protecting the relays and circuit board and batteries.

Figure 2:
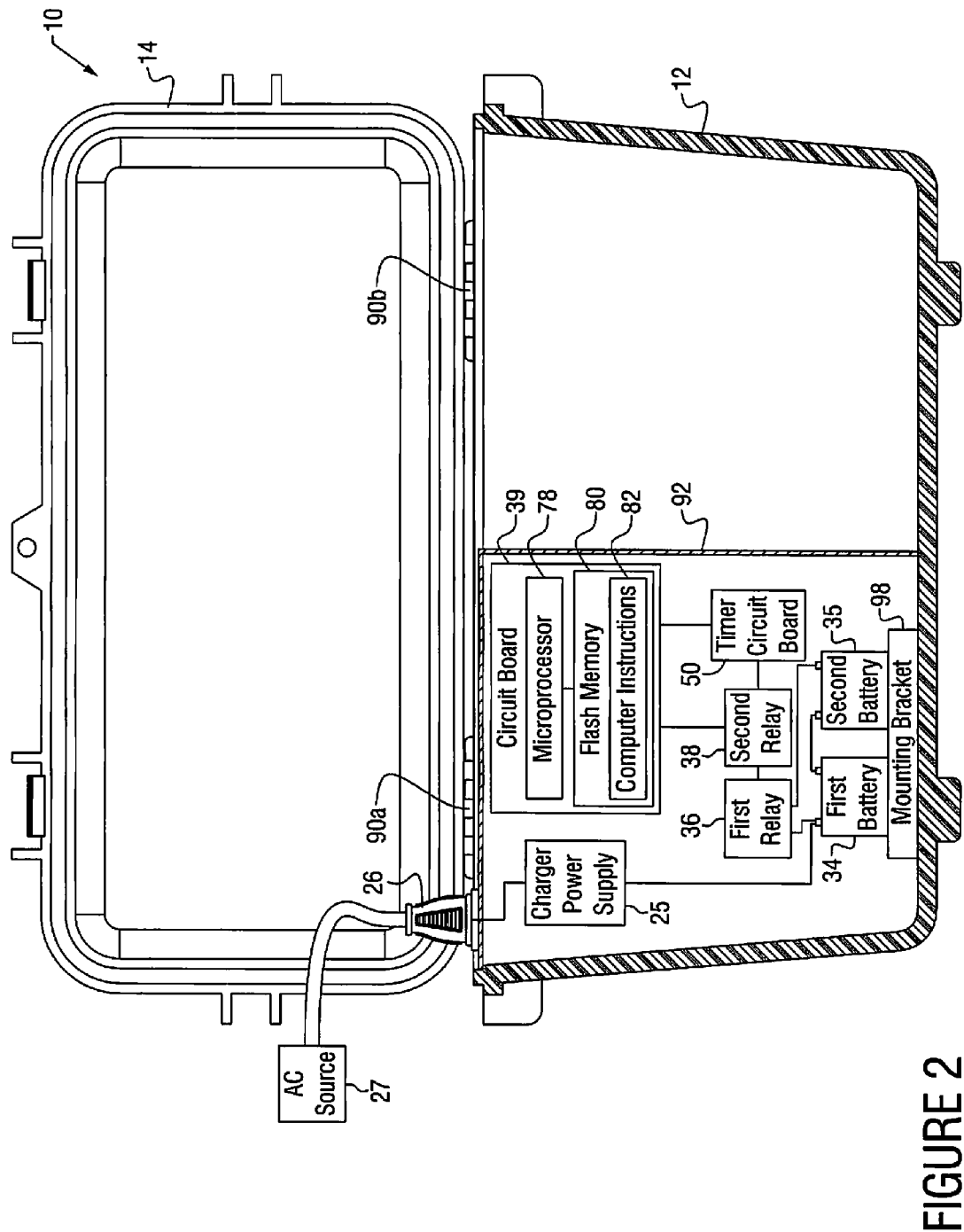
FIG. 2 is an interior view of the housing.

Turning now to the Figures, FIG. 1 is front perspective view of the housing 10 with body 12 and lid 14. The body and lid are connected by a first hinge 90*a* and a second hinge 90*b* the hinges are shown in FIG. 2.

FIG. 1 also shows latching means 83*a* and 83*b* can connect the lid to the body as shown in the embodiment. It is possible only one latching means is used.

Locking means 84*a* and 84*b* are for securely locking the lid 14 to the body 12. The body can have support feet 13*a* and 13*b* in this embodiment.

Body reinforcing ribs 86*a,b,c* and *d* are seen on a first side of the body, and additional body reinforcing ribs can be molded into the body of the housing on the opposite side of the body and on each end side of the body.

Lid reinforcing ribs 88*a,b,c* and *d* can be formed in the lid as the lid is molded.

A groove 75 is formed in the lid on the side facing the body and into the groove can be placed a seal 76 such as a rubber gasket or other means to keep water from entering the housing when the lid is latched to the body. The seal is preferably a continuous rubberized gasket about ⅛ inch in diameter.

The face plate 16 has a first plug 18 for transmitting current and signals from the housing.

The face plate 16 has a second plug 20 for transmitting current and signals from the housing.

A first cord 22 engages the first plug 18 and a second cord 24 engages the second plug 20.

An A/C plug 26 is shown in the face plate for receiving A/C power from a source such as a charger or from an inverter that is remote to the housing.

Also on the face plate 16 is a trip momentary push button 40.

In the face plate 16 is close momentary push button 42.

On the face plate 16 is a charge/close momentary push button 44.

The face plate 16 has a jog momentary push button 46.

An on/off switch 47 is also shown in the face plate 16 that connects and disconnects the batteries from the circuits.

A circuit breaker 48 is in the face plate 16.

Three potentiometers are on the face plate 16.

A first timer potentiometer 54, a second timer potentiometer 56 and a stroke potentiometer 52.

This Figure depicts the radio transmitter/receiver 57 connected by a cord 59 to the relays and batteries under the face plate 16.

An automatic shut off switch 74 can be in the face plate 16 in an embodiment.

FIG. 2 shows that the face plate 16 can have a face plate side 92 for securing other equipment tightly into the housing and preventing water for entering the electronics under the faceplate 16.

An additional plug 94 with an additional cord 96 can be used on the face plate for engaging additional remote devices.

FIG. 2 shows an interior view of another embodiment of the electronics of the RSO, namely a first 12 volt battery 34 connected in parallel with a second 12 volt battery 35.

Both batteries 34 and 35 connect to the first relay 36 which in turn connects to the second relay 38 which in turn engages the circuit board 39.

Timer circuit board 50 is between the circuit board 39 and the second relay 38.

In this FIG. 2 embodiment, the batteries are charged from an A/C source 27 outside the housing that engages charger power supply 25 through plug 26.

The batteries can be secured to a mounting bracket 98 in the housing. The mounting bracket in a different embodiment can cover the batteries so the batteries do not shake loose during movement.

Additionally, FIG. 2 shows the circuit board having a microprocessor 78, flash memory 80 connected to the microprocessor and computer instructions 82 in the flash memory for shutting off the power to the operator when a signal is provided from the timer circuit board.

Figure 3:
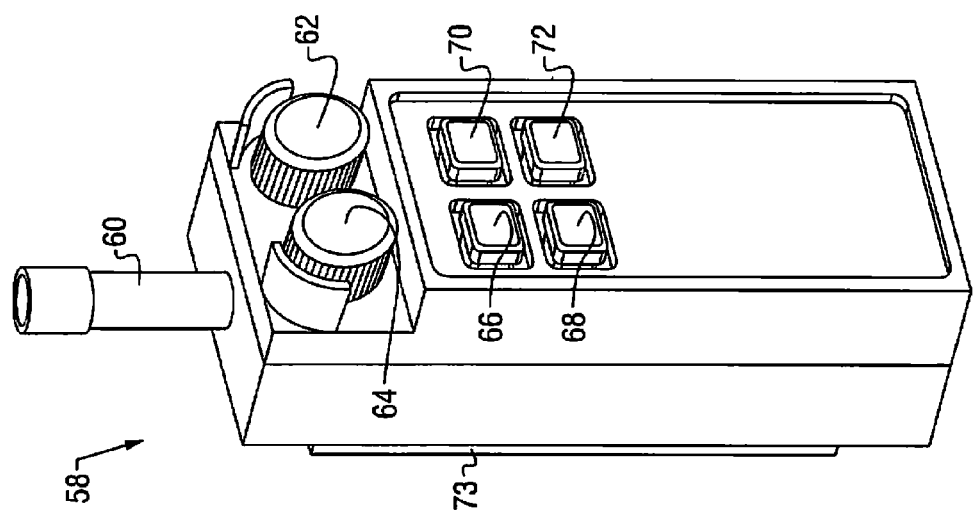
FIG. 3 is as top view of the wireless radio controller.

FIG. 3 shows the wireless radio controller 58 that communicates with the radio transmitter/receiver 57 shown in FIG. 1. In this embodiment the wireless radio controller 58 has antennae 60 with an on-button 62, and off-button 64, a jog button 66, a trip button 68, a close button 70 and a charge/close button 72 for controlling the circuits in a wireless manner. Velcro™ or another attaching means 73 can be used to secure the wireless radio controller to the interior of the housing for easy transport.

While these embodiments have been described with emphasis on the embodiments, it should be understood that within the scope of the appended claims, the embodiments might be practiced other than as specifically described herein.

What is claimed is:

1. A remote switch operator comprising:
   a. a housing having a body and a lid;
   b. a face plate within the housing;
   c. a first plug in the face plate for providing current and signals from the housing;
   d. a second plug in the face plate for providing current and signals from the housing;
   e. a first cord attached to the first plug for engaging a first operating component of a first remote device;
   f. a second cord attached to the second plug for engaging a second operating component of the first remote device;
   g. a charger power supply in the housing beneath the face plate for receiving AC current from an outside source;
   h. an AC plug in the face plate for receiving a AC current from the AC outside source and transferring the AC current to the charger power supply in the housing;
   i. at least one battery disposed beneath the face plate in the housing
   j. a first relay connected to a second relay and the at least one battery disposed beneath the face plate in the housing;
   k. a circuit board connected to at least one relay and at least one battery within the housing below the face plate;
   l. a trip momentary push button in the face plate engaging the circuit board;
   m. a close momentary push button in the face plate engaging the circuit board;
   n. a charge close momentary push button in the face plate engaging the circuit board;
   o. a jog momentary push button in the face plate engaging the circuit board;
   p. on/off switch in the face plate for connecting or disconnecting the batteries with the at least one relay;
   q. a circuit breaker in the face plate connected between the relays and the on/off switch;
   r. a timer circuit board in communication with at least one relay;
   s. a first timer potentiometer in the face plate connected to the timer circuit board;
   t. a second timer potentiometer in the face plate connected to the timer circuit board; and
   u. a stroke potentiometer in the face plate connected to the timer circuit board.

2. The remote switch operator of claim 1, further comprising a radio transmitter/receiver connected to the circuit board and a wireless radio controller removably connected under the face plate for remotely actuating the relays a distance of from the remote switch operator.

3. The remote switch operator of claim 2, wherein the wireless radio controller comprises an on button, an off button, a jog button, a trip button, a close button, and a charge/close button.

4. The remote switch operator of claim 1, further comprising an automatic shut off switch on the face plate connected to the circuit board for disabling a remote device when the remote device exceeds a preset amperage.

5. The remote switch operator of claim 1, wherein the housing is water resistant.

6. The remote switch operator of claim 5, wherein the housing further comprising a seal for providing a water resistant, explosion proof engagement between the body and the lid.

7. The remote switch operator of claim 1, wherein the circuit board comprises a microprocessor with flash memory with computer instructions for comparing signals from the potentiometers to a predetermined threshold.

8. The remote switch operator of claim 1, further comprising at least one locking means disposed between the lid and the body.

9. The remote switch operator of claim 1, further comprising at least one body reinforcing rib on the body and at least one lid reinforcing rib on the lid to prevent deformation of the housing in the presence of heat over 140 degrees Fahrenheit and pressures exceeding 1 atm.

10. The remote switch operator of claim 1, wherein the remote switch operator does not exceed 50 pounds.

11. The remote switch operator of claim 1, further comprising a hinge to pivotably secure the lid to the body.

12. The remote switch operator of claim 1, wherein the face plate comprises a face plate side for supporting the radio transmitter/receiver within the housing while further protecting the relays and circuit board and batteries.

13. The remote switch operator of claim 1, further comprising at least one additional plug connected to the batteries, replays and circuit board for engaging at least one additional cord for operating at least one additional remote device.

14. The remote switch operator of claim 1, wherein at least one of the cords is a retractile cord.

15. The remote switch operator of claim 1, wherein the second component of the first remote device is a first component of a second remote device.

16. The remote switch operator of claim 1, wherein the push buttons are a member of the group consisting of: toggles, membrane covered touch pads, a touch screen, or an electronic touch display.

17. The remote switch operator of claim 1, wherein the radio transmitter/receiver is operated by a cell phone, PDA, iPhone™, a blue tooth or a similar remote control device to operate the remote operated switch.

* * * * *